United States Patent
Yu et al.

(10) Patent No.: US 7,419,293 B2
(45) Date of Patent: Sep. 2, 2008

(54) LIGHT GUIDE PLATE AND BACKLIGHT MODULE USING THE SAME

(75) Inventors: Chih-Chia Yu, Miao-Li (TW); Cheng-Fang Chang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 110 days.

(21) Appl. No.: 11/317,115

(22) Filed: Dec. 23, 2005

(65) Prior Publication Data

US 2006/0139961 A1 Jun. 29, 2006

(30) Foreign Application Priority Data

Dec. 24, 2004 (TW) .............................. 93220813 U

(51) Int. Cl.
*F21V 7/04* (2006.01)
*G02F 1/1333* (2006.01)

(52) U.S. Cl. .................. 362/634; 362/621; 362/628; 362/611; 349/58

(58) Field of Classification Search ................ 362/630, 362/611, 614, 632–634, 621, 628; 349/58
See application file for complete search history.

(56) References Cited

U.S. PATENT DOCUMENTS

| | | | |
|---|---|---|---|
| 5,619,351 A | 4/1997 | Funamoto et al. | |
| 5,990,989 A * | 11/1999 | Ozawa | 349/61 |
| 6,231,202 B1 * | 5/2001 | Kozaka et al. | 362/614 |
| 6,343,868 B1 * | 2/2002 | Itoh | 362/609 |
| 6,545,732 B2 * | 4/2003 | Nakano | 349/58 |
| 6,811,276 B2 * | 11/2004 | Moon | 362/600 |
| 6,834,974 B2 * | 12/2004 | Lee et al. | 362/632 |
| 6,839,100 B1 * | 1/2005 | Saito et al. | 349/58 |
| 6,910,784 B2 * | 6/2005 | Ito | 362/632 |
| 6,966,686 B2 * | 11/2005 | Chen | 362/634 |
| 7,014,350 B2 * | 3/2006 | Nomura | 362/623 |
| 7,207,707 B2 * | 4/2007 | Huang et al. | 362/614 |
| 2004/0090766 A1 * | 5/2004 | Chen | 362/31 |
| 2005/0180171 A1 * | 8/2005 | Huang et al. | 362/633 |

* cited by examiner

*Primary Examiner*—Y My Quach Lee
*Assistant Examiner*—David J Makiya
(74) *Attorney, Agent, or Firm*—Wei Te Chung

(57) ABSTRACT

A backlight module (2) includes a light source (21) and a light guide plate (23). The light source includes a lamp (231) and two electrode cases (233), the two electrode cases engage with opposite ends of the lamp. The light guide plate includes a light output surface (212), a bottom surface (213), two adjacent light incident surfaces (211), two side surfaces (214), and two holding devices (215). The two holding devices are respectively provided at diagonally opposite corners of the light guide plate, where the light incident surfaces are respectively adjacent the side surfaces, and the holding devices are for retaining electrode cases. The light source is disposed adjacent to the light incident surfaces. The lamp are not liable to shock, so the lamp can not be damaged. Further, the backlight module eliminates the need for rubber rings. Thereby reducing the cost of the backlight module.

15 Claims, 6 Drawing Sheets

LIGHT GUIDE PLATE AND BACKLIGHT MODULE USING THE SAME

FIELD OF THE INVENTION

The present invention relates to light guide plates and backlight modules using the same, and especially to a backlight module used in liquid crystal displays or the like.

BACKGROUND

Most portable electronic devices such as laptop and notebook computers, mobile phones, and game devices have flat viewing screens unlike the cathode-ray-tube (CRT) monitors of conventional desktop computers. Nevertheless, users still generally expect the flat viewing screens to provide performance equal to that of CRT monitors. To meet this demand, computer manufacturers have sought to build flat panel displays (FPDs) offering superior resolution, color, and contrast, while at the same time requiring minimal power consumption. Liquid crystal displays (LCDs) are one type of FPD that satisfy these expectations. However, the liquid crystals of an LCD are not self-luminescent. Rather, the LCD generally needs a surface emitting device such as a backlight module which offers sufficient luminance (brightness) in a wide variety of ambient light environments.

FIG. 7 is an exploded, isometric view of a conventional backlight module, and FIG. 8 is an assembled view of the backlight module shown in FIG. 7. The backlight module 1 includes a light guide plate 11 and a light source 13. The light guide plate 11 includes a light output surface 112, a bottom surface 113 opposite to the light output surface 112, and two adjacent light incident surfaces 111 interconnecting the light output surface 112 and the bottom surface 113. The light source 13 includes an L-shaped lamp 131 and two electrode cases 133. The electrode cases 133 are respectively connected with two ends of the lamp 131. The lamp 131 is disposed adjacent to light incident surfaces 111. A plurality of rubber rings 15 is engaged around the lamp 131, so as to prevent the lamp 131 from contacting the light incident surfaces 111.

However, the light source 11 and the light guide plate 13 are generally not firmly fixed to each other. During transportation of an LCD incorporating the backlight module 1, the LCD is liable to sustain vibration or shock, and the lamp 131 may be damaged or broken. In addition, in assembly of the backlight module 1, the rubber rings 15 have to be attached on the lamp 131 before the light source 11 is attached to the light guide plate 13. This is an unduly laborious process, which increases the time needed for assembly and thus adds to manufacturing costs.

Therefore, what is needed is a backlight module which can overcome the above-described problems.

SUMMARY

A light guide plate includes a light output surface, a bottom surface, two adjacent light incident surfaces and two side surfaces interconnecting the light output surface and the bottom surface, and two holding devices. The two holding devices are respectively provided at diagonally opposite corners of the light guide plate, where the light incident surfaces are respectively adjacent the side surfaces, and the holding devices are for retaining electrode cases of a light source.

A backlight module includes a light source and the above-described light guide plate. The light source includes a lamp and two electrode cases, the two electrode cases engage with opposite ends of the lamp. The light source is disposed adjacent to the light incident surfaces. The holding devices are used for retaining the electrode cases.

In operation, the backlight module employing the light guide plate disposed onto a frame is used in an LCD. The first and second sidewalls, the top wall, and the frame can prevent the electrode case from moving, so that the retaining space firmly fix the electrode case therein. The lamp are not liable to shock, so the lamp can not be damaged. Further, the backlight module eliminates the need for rubber rings. Thereby reducing the cost of the backlight module.

Other advantages and novel features will become more apparent from the following detailed description when taken in conjunction with the accompanying drawings.

DETAILED DESCRIPTION OF PREFERRED EMBODIMENTS

Figure 1:
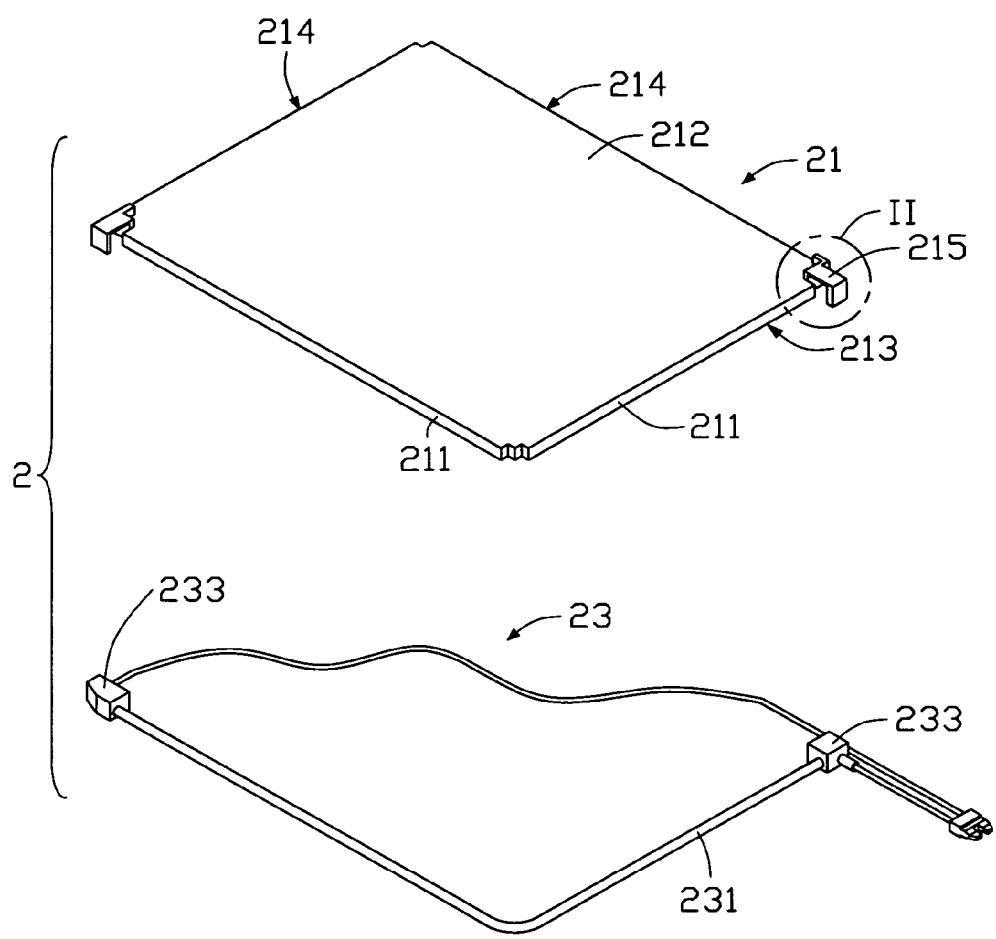
FIG. 1 is an exploded, isometric view of a backlight module according to a first embodiment of the present invention.
Figure 2:
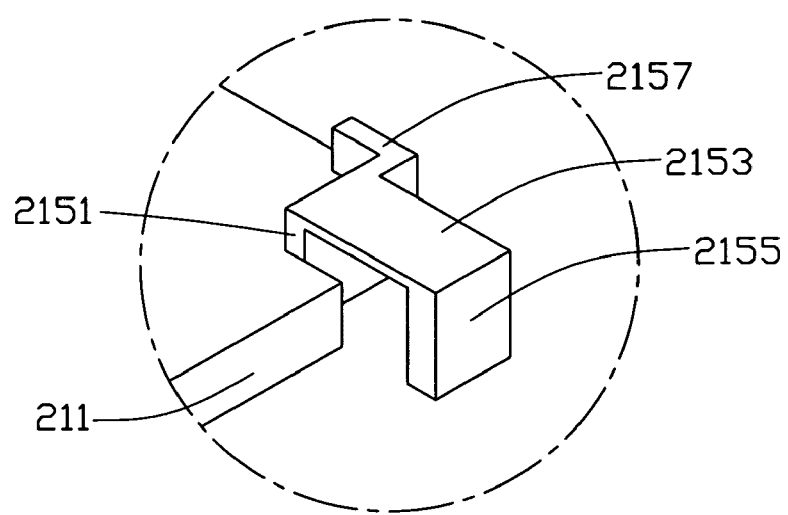
FIG. 2 is an enlarged view of a circled portion II of FIG. 1.
Figure 3:
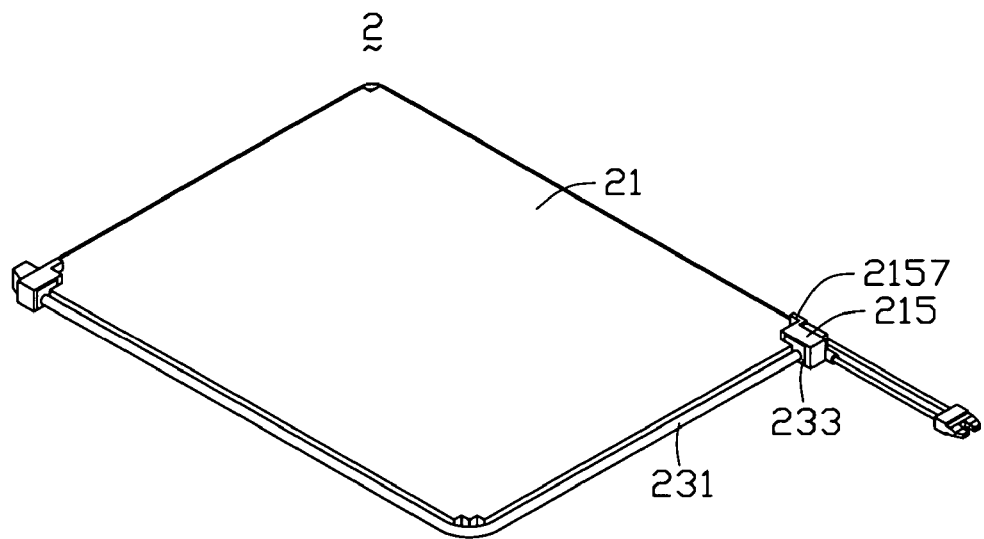
FIG. 3 is an assembled view of the backlight module shown in FIG. 1.

Referring to FIGS. 1, 2 and 3, a backlight module 2 according to a first embodiment of the present invention includes a light guide plate 21 and a light source 23. The light guide plate 21 includes a light output surface 212, a bottom surface 213 opposite to the light output surface 212, and two adjacent light incident surfaces 211 and two adjacent side surfaces 214 interconnecting the light output surface 212 and the bottom surface 213. A holding device 215 is provided at each of two diagonally opposite corners of the light guide plate 21 where the light incident surfaces 211 adjoin the corresponding side surfaces 214. The light source 23 includes an L-shaped lamp 231, and two electrode cases 233 connected with two opposite ends of the lamp 231 respectively.

Each holding device 215 includes a first sidewall 2151, a second sidewall 2155, and a top wall 2153. The first sidewall 2151 integrally extends upwardly from the light guide plate 21 to a level higher than the light output surface 212. The first and second sidewalls 2151, 2155 are parallel to the corresponding light incident surface 211, and the top wall 2153 horizontally interconnects the first and second sidewalls 2151, 2155. The first and second sidewalls 2151, 2155 and the top wall 2153 cooperatively define a first retaining space for fixing the corresponding electrode case 233 therein. The holding device 215 further includes a third sidewall 2157 integrally extending upwardly from the light guide plate 21 to a same level as that of the first sidewall 2151. The third sidewall 2157 is perpendicular to and adjoins the first sidewall 2151. That is, the third sidewall 2157 is parallel to and shares a common plane with the corresponding side surface 214. The first and third sidewalls 2151, 2157 cooperatively define an inner holding corner of the holding device 215. The inner holding corners of the holding devices 215 and the light output surface 212 cooperatively define a second retaining space (not labeled) above the light guide plate 21. Optical films of an associated LCD, such as a prism film and a brightness enhancement film, can be held in the retaining space.

In assembly of the backlight module 2, the lamp 231 of the light source 23 is disposed adjacent to the light incident surfaces 211 of the light guide plate 21. The electrode cases 233 of the light source 23 are fixed in the first retaining spaces of the holding devices 215. The first and second sidewalls 2151, 2155 of each holding device 215 prevent the corresponding electrode case 233 from moving along directions perpendicular to the corresponding light incident surface 211. In this position, a certain distance is maintained between the lamp 231 and each light incident surface 211.

In application, the backlight module 2 is disposed onto a frame of the associated LCD. At each holding device 215, the first and second sidewalls 2151, 2155, the top wall 2153, and the frame cooperatively prevent the corresponding electrode case 233 from moving. That is, the electrode case 233 is firmly fixed in the first retaining space. With the electrode cases 233 fixed thus, the lamp 231 is held securely in position. The lamp 231 is thus unlikely to sustain shock and resultant damage. Further, the backlight module 2 eliminates the need for rubber rings. Thereby, the cost of the backlight module 2 can be reduced.

Figure 4:
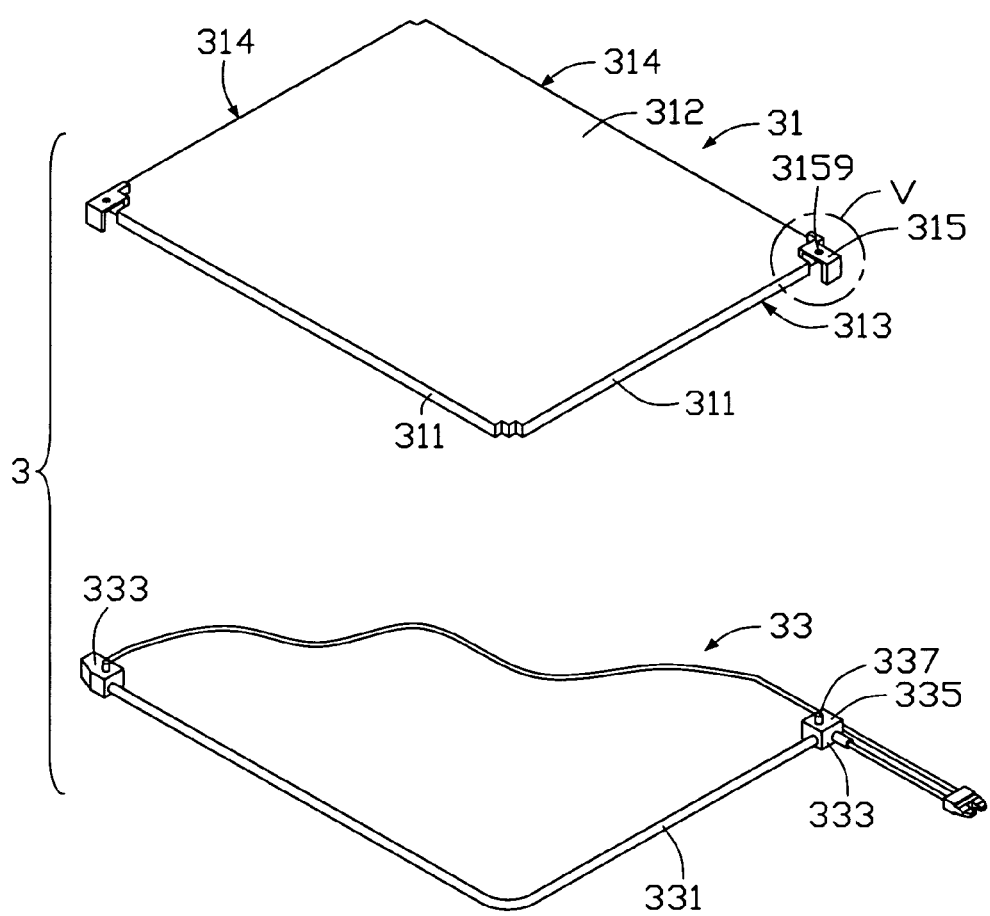
FIG. 4 is an exploded, isometric view of a backlight module according to a second embodiment of the present invention.
Figure 5:
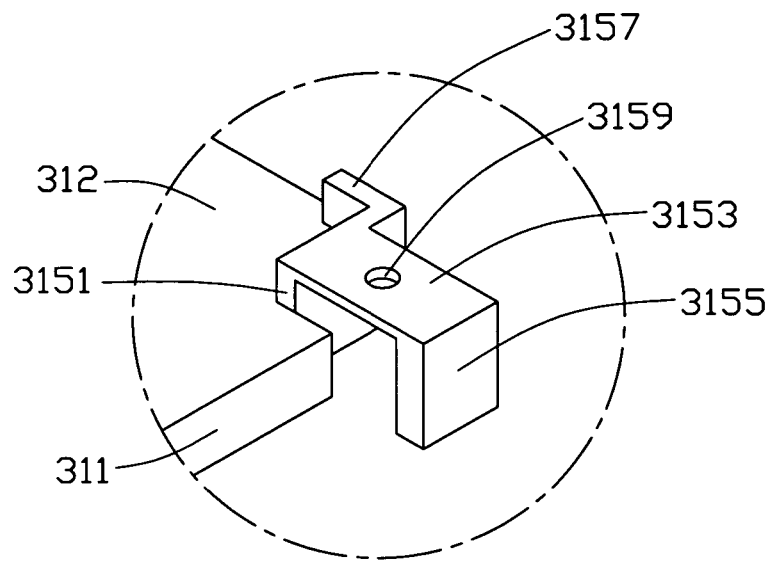
FIG. 5 is an enlarged view of a circled portion V of FIG. 4.
Figure 6:
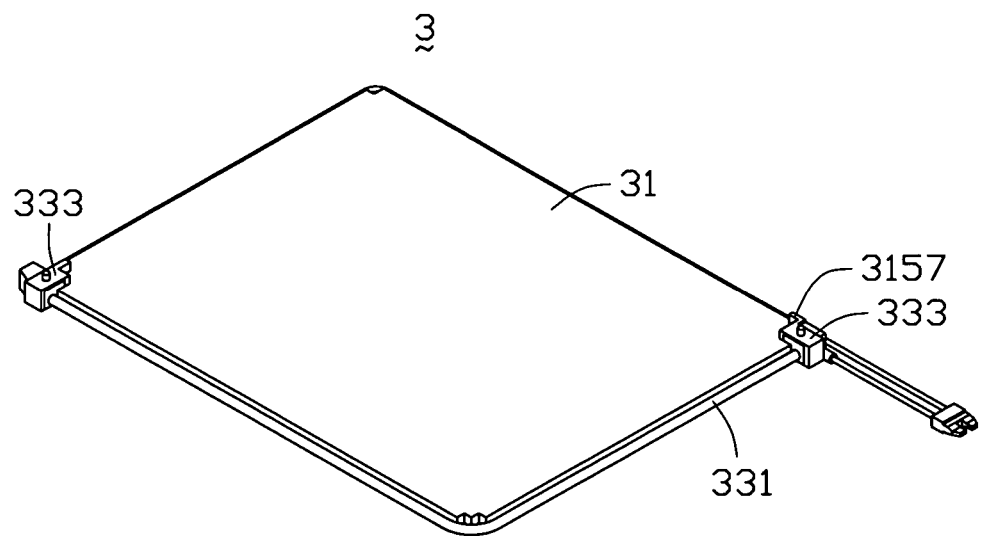
FIG. 6 is an assembled view of the backlight module shown in FIG. 4.
Figure 7:
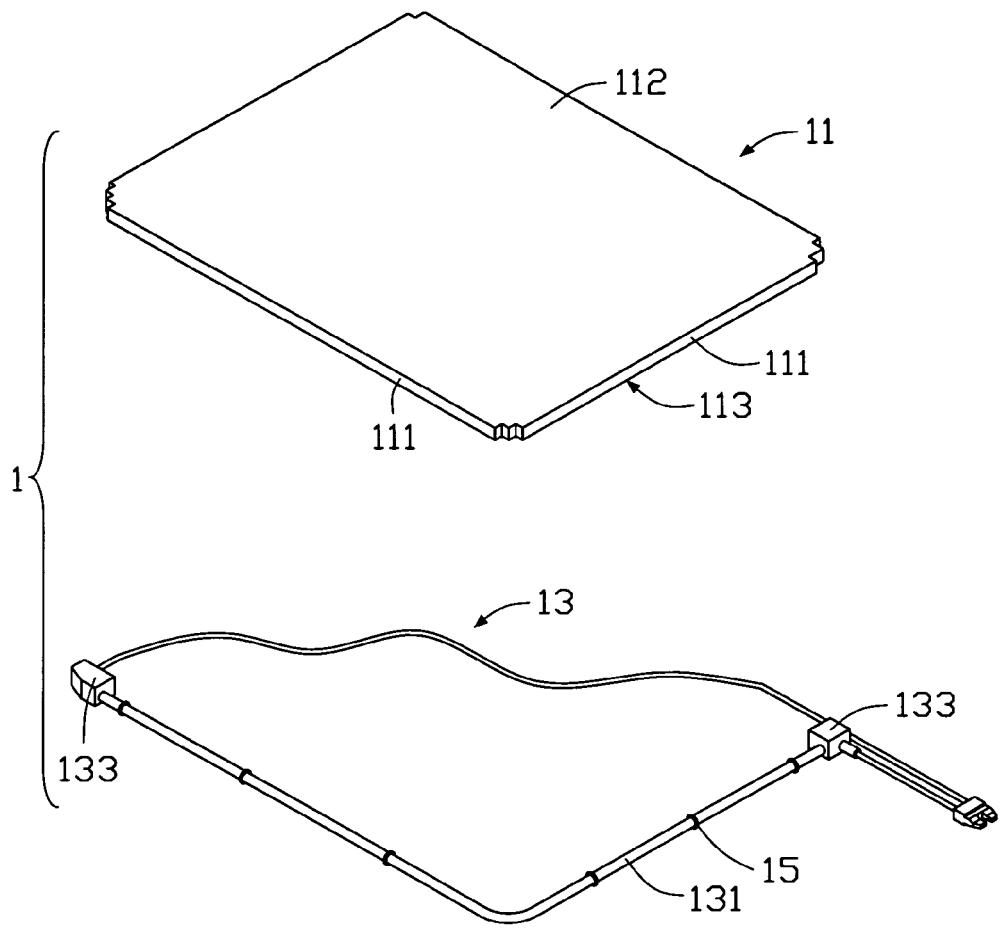
FIG. 7 is an exploded, isometric view of a conventional backlight module.
Figure 8:
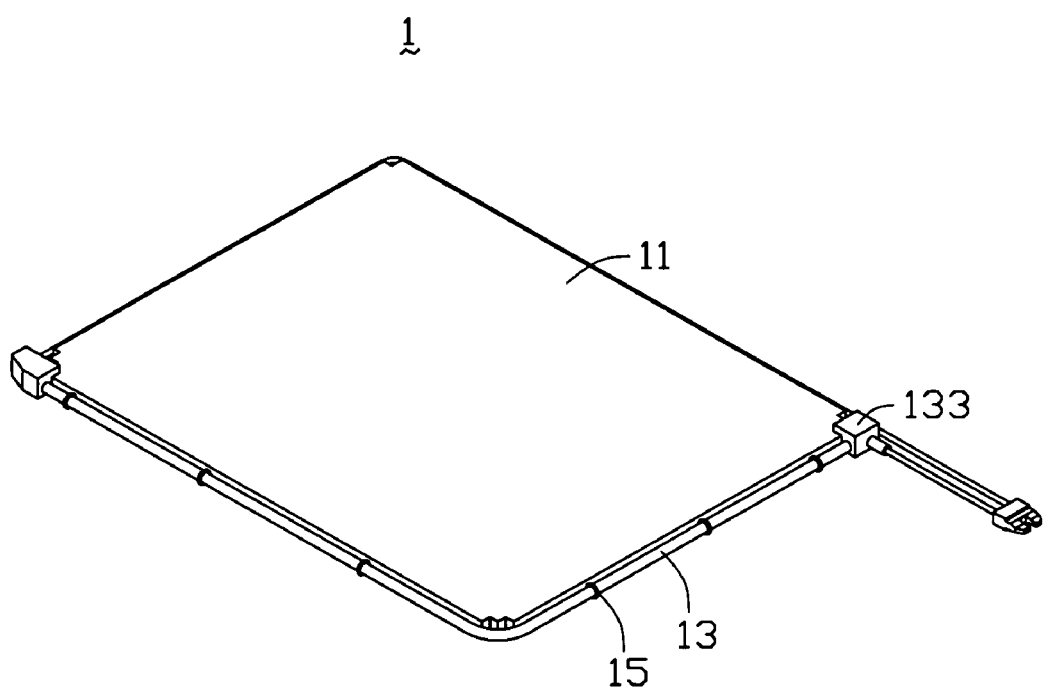
FIG. 8 is an assembled view of the backlight module shown in FIG. 7.

Referring to FIGS. 4, 5 and 6, a backlight module according to a second embodiment of the present invention includes a light guide plate 31 and a light source 33. The light guide plate 31 includes a light output surface 312, a bottom surface 313 opposite to the light output surface 312, and two adjacent light incident surfaces 311 and two adjacent side surfaces 314 interconnecting the light output surface 312 and the bottom surface 313. A holding device 315 is provided at each of two diagonally opposite corners of the light guide plate 31 where the light incident surfaces 311 adjoin the corresponding side surfaces 314. The light source 33 includes an L-shaped lamp 331, and two electrode cases 333 connected with two opposite ends of the lamp 331 respectively.

Each holding device 315 includes a first sidewall 3151, a second sidewall 3155, a top wall 3153, a retaining space, a third sidewall 3157, and an inner holding corner. The first sidewall 3151, second sidewall 3155, top wall 3153, retaining space, third sidewall 3157 and inner holding corner are similar to the first sidewall 2151, second sidewall 2155, top wall 2153, first retaining space, third sidewall 2157 and inner holding corner of the corresponding holding device 215 of the backlight module 2. However, the top wall 3153 of the holding device 315 defines a hole 3159 therein.

Each electrode case 333 has an upper surface 335. A post 337 extends up from the upper surface 335, for engaging in the hole 3159 of a corresponding holding device 315.

In assembly of the backlight module 3, the lamp 331 of the light source 33 is disposed adjacent to the light incident surfaces 311 of the light guide plate 31. The electrode cases 333 of the light source 33 are fixed in the retaining spaces of the holding devices 315, with the posts 337 being engagingly received in the holes 3159. The first and second sidewalls 3151, 3155 of each holding device 315 prevent the corresponding electrode case 333 from moving along directions perpendicular to the corresponding light incident surface 311. In this position, a certain distance is maintained between the lamp 331 and each light incident surface 311.

In application, the backlight module 3 is disposed onto a frame of an associated LCD. At each holding device 315, the first and second sidewalls 3151, 3155, the top wall 3153, and the frame cooperatively prevent the corresponding electrode case 333 from moving. That is, the electrode case 333 is firmly fixed in the retaining space. With the electrode cases 333 fixed thus, the lamp 331 is held securely in position. The lamp 331 is thus unlikely to sustain shock and resultant damage. Further, the backlight module 3 eliminates the need for rubber rings. Thereby, the cost of the backlight module 3 can be reduced.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate, comprising a light output surface; a bottom surface; two adjacent light incident surfaces and two side surfaces interconnecting the light output surface and the bottom surface; and two holding devices respectively provided at diagonally opposite corners of the light guide plate where the light incident surfaces are respectively adjacent the side surfaces, the holding devices being for retaining electrode cases of a light source; wherein each of the holding devices is integrally formed with the light guide plate, and each of the holding devices includes a first sidewall, a second sidewall, and a top wall, the first and second sidewalls are parallel to the corresponding light incident surface, and the top wall interconnects the first and second sidewalls, and the first sidewall extends upwardly from the light guide plate to a point higher than the light output surface.

2. The light guide plate as claimed in claim 1, wherein the first sidewall, the second sidewall, and the top wall cooperatively define a retaining space for retaining one of the electrode cases of the light source.

3. The light guide plate as claimed in claim 2, wherein each of the holding devices further includes a third sidewall parallel to the corresponding side surface.

4. The light guide plate as claimed in claim 1, wherein the top wall defines a hole for engagingly receiving a protrusion of a corresponding one of the electrode cases therein.

5. A backlight module, comprising: a light source including a lamp and two electrode cases, the electrode cases engaged with opposite ends of the lamp; and a light guide plate including a light output surface, a bottom surface, two adjacent light incident surfaces and two side surfaces interconnecting the light output surface and the bottom surface; and two holding devices respectively provided at diagonally opposite corners of the light guide plate where the light incident surfaces are respectively adjacent the side surfaces, the holding devices being for retaining electrode cases of the light source, wherein each of the holding devices is integrally formed with the light guide plate, each of the holding devices includes a first sidewall, a second sidewall, and a top wall, the first and second sidewalls are parallel to the corresponding light incident surface, and the top wall interconnecting the first and second sidewalls; wherein the light source is disposed adjacent to the light incident surfaces, with the holding devices retaining the electrode cases, and the first sidewall extends upwardly from the light guide plate to a point higher than the light output surface.

6. The backlight module as claimed in claim 5, wherein the first sidewall, the second sidewall, and the top wall cooperatively define a retaining space retaining a corresponding one of the electrode eases therein.

7. The backlight module as claimed in claim 6, wherein each of the holding devices further includes a third sidewall parallel to the corresponding side surface.

8. The backlight module as claimed in claim 5, wherein each of the electrode cases has an upper surface, and a protrusion extends up from the upper surface.

9. The backlight module as claimed in claim 8, wherein the top wall defines a hole engagingly receiving the protrusion of the corresponding electrode case therein.

10. The backlight module as claimed in claim 8, wherein the lamp is generally b-shaped.

11. A light guide plate, comprising:
  a light output surface;
  a bottom surface;
  two adjacent light incident surfaces and two side surfaces arranged end-to-end to cooperatively form a four-sided structure interconnecting the light output surface and the bottom surface; and
  two U-shaped holding devices respectively integrally formed with and provided at diagonally opposite corners of the light guide plate, wherein each of the U-shaped holding devices defines a top portion and a cavity below the top portion, and the cavity is configured for retaining an electrode case of a light source;
  wherein each of the U-shaped holding devices includes a first plate extending upwardly from the corner of the light guide plate to a point higher than the light output surface, a second plate perpendicularly extending from a toy edge of the first plate, and a third plate extending downwardly from an edge of the second plate, and the first and third plates are parallel to the corresponding light incident surface.

12. The light guide plate as claimed in claim 11, wherein the top portion is higher than the light output surface, the cavity spans from a plane inwardly offset from the corresponding light incident surface to a plane outwardly offset from the corresponding light incident surface, and a bottom of the cavity is exposed to an outside of the light guide plate at the bottom surface.

13. The light guide plate as claimed in claim 1, wherein each of the first sidewall, the second sidewall, and the top wall is planar.

14. The backlight module as claimed in claim 5, wherein each of the first sidewall, the second sidewall, and the top wall is planar.

15. The light guide plate as claimed in claim 11, wherein each of the first plate, the second plate, and the third plate is planar.

* * * * *